US008437116B2

(12) United States Patent
Gadkaree et al.

(10) Patent No.: US 8,437,116 B2

(45) Date of Patent: May 7, 2013

(54) ELECTRIC DOUBLE LAYER CAPACITORS, CAPACITOR MATERIALS AND METHODS OF MAKING THE SAME

(75) Inventors: Kishor Purushottam Gadkaree, Big Flats, NY (US); Joseph Frank Mach, Lindley, NY (US)

(73) Assignee: Corning Incorporated, Corning, NY (US)

(*) Notice: Subject to any disclaimer, the term of this patent is extended or adjusted under 35 U.S.C. 154(b) by 1101 days.

(21) Appl. No.: 11/494,206

(22) Filed: Jul. 27, 2006

(65) Prior Publication Data

US 2008/0024954 A1 Jan. 31, 2008

(51) Int. Cl.
*H01G 9/00* (2006.01)

(52) U.S. Cl.
USPC .......................................... 361/502; 29/25.03

(58) Field of Classification Search .................. 361/502; 29/25.03
See application file for complete search history.

(56) References Cited

U.S. PATENT DOCUMENTS

| | | | | |
|---|---|---|---|---|
| 4,725,927 | A * | 2/1988 | Morimoto et al. | 361/502 |
| 6,024,899 | A * | 2/2000 | Peng et al. | 264/29.1 |
| 6,156,697 | A | 12/2000 | Gadkaree | 502/427 |
| 6,201,685 | B1 | 3/2001 | Jerabek et al. | 361/502 |
| 6,212,062 | B1 | 4/2001 | Day et al. | 361/502 |
| 6,255,733 | B1 | 7/2001 | Gardner | 257/762 |
| 6,304,426 | B1 | 10/2001 | Wei et al. | 361/502 |
| 6,487,066 | B1 | 11/2002 | Niiori et al. | 361/502 |
| 6,565,701 | B1 | 5/2003 | Jerabek et al. | 156/305 |
| 6,585,701 | B1 | 7/2003 | Dysarz | 604/263 |
| 6,592,838 | B1 | 7/2003 | Nomoto et al. | 423/445 |
| 6,714,391 | B2 | 3/2004 | Wilk et al. | 361/15 |
| 6,738,252 | B2 | 5/2004 | Okamura et al. | 361/502 |
| 7,385,801 | B2 | 6/2008 | Ando et al. | |
| 7,691,782 | B2 * | 4/2010 | Tanaka | 502/427 |
| 2004/0085710 | A1 | 5/2004 | Takeuchi et al. | 361/502 |
| 2004/0090736 | A1 | 5/2004 | Bendale et al. | 361/502 |
| 2005/0181941 | A1 | 8/2005 | Sugo et al. | 502/427 |
| 2005/0214539 | A1 | 9/2005 | Ying et al. | 428/408 |
| 2005/0219797 | A1 | 10/2005 | Nakamura et al. | |
| 2005/0221981 | A1 | 10/2005 | Wagh et al. | 502/423 |
| 2007/0002523 | A1 * | 1/2007 | Ando et al. | 361/503 |

FOREIGN PATENT DOCUMENTS

| | | |
|---|---|---|
| JP | 2001110689 | 4/2001 |
| JP | 2004018292 A * | 1/2004 |
| WO | 2004097867 A2 | 11/2004 |

OTHER PUBLICATIONS

Translation of JP2004-018292.*
Translation of JP2004-018292 provided on Jun. 2009.*

* cited by examiner

*Primary Examiner* — David M Sinclair
(74) *Attorney, Agent, or Firm* — Michael W. Russell

(57) ABSTRACT

Carbon materials and methods of manufacturing carbon materials for use in high energy devices, such as electric double layer capacitors are described. High energy devices manufactured with carbon materials contemplated herein have high energy density. Methods of manufacturing carbon materials generally include providing a carbon precursor and an additive, mixing the additive with the carbon precursor prior to curing the carbon precursor, carbonizing the carbon precursor and removing the additive to form the carbon material. Such carbon materials can be used in electric double layer capacitors.

11 Claims, 4 Drawing Sheets

ELECTRIC DOUBLE LAYER CAPACITORS, CAPACITOR MATERIALS AND METHODS OF MAKING THE SAME

FIELD OF THE INVENTION

This invention relates to carbon materials and methods of manufacturing carbon materials. More particularly, the invention relates to carbon materials for electrodes and other components used in high energy density storage devices, such as electric double layer capacitors.

BACKGROUND OF THE INVENTION

An electric double layer capacitor or EDLC is a type of capacitor that typically consists of carbon electrodes (separated via a porous separator), current collectors and an electrolyte solution. When electric potential is applied to an EDLC cell, ionic current flows due to the attraction of anions to the positive electrode and cations to the negative electrode. Electric charge is stored at the interface between each polarized electrode and the electrolyte solution.

EDLC designs vary depending on application and can include, for example, standard jelly roll designs, prismatic designs, honeycomb designs, hybrid designs or other designs known in the art. The energy density and the specific power of an EDLC can be affected by the properties thereof, including the electrode and the electrolyte utilized. With respect to the electrode, high surface area carbons, carbon nanotubes and other forms of carbon and composites have been utilized in manufacturing such devices. Of these, carbon based electrodes are common and are widely used in commercially available devices.

Conventional carbons for such electrodes can be prepared from natural materials such as wood, charcoal and coal tar pitch, or from synthetic materials such as resins. Where synthetic precursors are utilized, the precursor is typically first crosslinked to solidify the precursor, carbonized in an inert atmosphere (such as nitrogen) and then activated. The activation is usually performed by heating the carbon at high temperatures (800-900° C.) in a partially oxidized atmosphere (such as carbon dioxide). During the carbonization/activation process, a large number of micropores are formed in the surface of the carbon material. Micropores increase the surface area of the carbon which results in increased capacitance. Other conventional carbons for electrodes may be formed from cured synthetic precursors that are treated with alkali or acids and then further treated at high temperatures to create porosity.

EDLC's incorporating carbon electrodes manufactured by such conventional processes heretofore usually have an energy density within the range of 6-7 Wh/l. However, this energy density range is not sufficient or practical for high energy applications, such as for hybrid vehicles. Accordingly, a new carbon material for use with EDLC's suited for high energy applications is needed.

SUMMARY OF THE INVENTION

The present invention is intended to address and obviate problems and shortcomings and otherwise improve previous carbon materials used in EDLC devices, and thus EDLC devices in general.

To achieve the foregoing, one embodiment of the present invention includes a carbon material formed from an uncured, synthetic, non-graphitizable carbon precursor wherein when the carbon material is incorporated as an electrode for the electric double layer capacitor, the electric double layer capacitor has an energy density of at least about 9 Wh/l.

To further achieve the foregoing, one embodiment of the present invention includes a carbon material for use in electric double layer capacitors formed from a synthetic, non-graphitizable carbon precursor, wherein the carbon material comprises pores formed around an additive mixed with the carbon prior to carbonization and subsequently removed after the mixing, wherein the carbon material has majority of pores with diameters greater than 40 Å and a pore diameter distribution in the range of 20-120 Å.

To further achieve the foregoing, one embodiment of the present invention includes an electrode for use in an electric double layer capacitor comprising a carbon material synthesized from a synthetic, non-graphitizable carbon precursor, the carbon material having pores formed around an additive mixed with the carbon prior to carbonization and subsequently removed after the mixing, wherein the carbon material has majority of pores with diameters greater than 40 Å and a pore diameter distribution in the range of 20-120 Å.

To further achieve the foregoing, one embodiment of the present invention includes an electric double layer capacitor comprising at least two electrodes wherein at least one of the electrodes comprises a carbon material having a synthetic, non-graphitized carbon, at least two current collectors, each in contact with one of the electrodes and an electrolyte interposed between the electrodes, wherein the electric double layer capacitor has an energy density of at least about 9 Wh/l.

To further achieve the foregoing, one embodiment of the present invention includes a method of manufacturing an electrode including providing an uncured, synthetic, non-graphitizable carbon precursor and an additive, mixing the additive with the synthetic, non-graphitizable carbon precursor prior to curing the carbon precursor, carbonizing the carbon precursor and the additive, removing the additive and creating a carbon material and forming the electrode from the carbon material.

To further achieve the foregoing, one embodiment of the present invention includes a method of manufacturing an electric double layer capacitor including forming an electrode by a method including providing an uncured, synthetic, non-graphitizable carbon precursor and an additive, mixing the additive with the synthetic, non-graphitizable carbon precursor prior to curing the carbon precursor, carbonizing the carbon precursor and the additive, removing the additive and creating a carbon material and forming the electrode from the carbon material. The method of manufacturing an electric double layer capacitor further includes immersing the electrode in an electrolyte solution, providing a current collector and assembling the electrode, the current collector and the electrolyte solution into the electric double layer capacitor.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

Figure 1A:
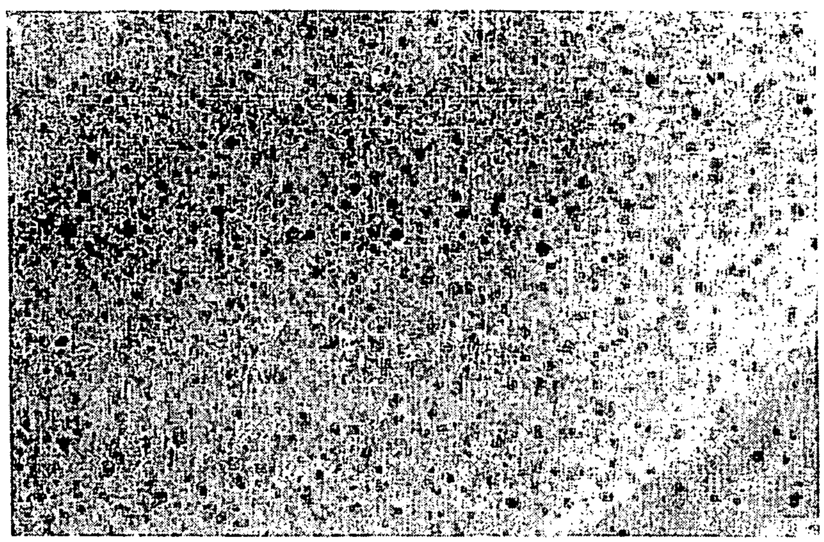
FIG. 1A is a transmission electron micrograph of a carbon material in accordance with one embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

The invention provides new carbon materials and methods of synthesis of carbon materials for electrodes and other components utilized in EDLC devices. As used herein, electric double layer capacitor or "EDLC" refers to any device configured to store a charge including, for example, standard jelly roll designs, prismatic designs, honeycomb designs, hybrids, supercapacitors, designs known as Ultracapacitors or other designs known in the art. The method for manufacturing or synthesizing the carbon material includes mixing an additive that does not leave carbon behind (such as an inorganic molecule) with a synthetic carbon precursor prior to cure of the synthetic carbon precursor. As further discussed below, mixture of carbon precursors and additives as described herein create a uniform distribution of the additive within the synthetic carbon precursors at a molecular level so that when the additive is removed, carbon materials with controlled porosity and enhanced pore diameters can be obtained. Formulating such carbon material into an electrode which is incorporated into an EDLC device results in an EDLC device having excellent energy density, as well as other unique characteristics.

A variety of synthetic carbon precursors can be utilized with the methods of the invention to yield the carbon material discussed herein. It is contemplated that synthetic carbon precursors will be utilized for some applications described herein (i.e., electrodes for EDLC). Depending on application, synthetic carbon precursors may be favored because naturally occurring carbons (contrasted with synthetic carbons) often include impurities which react negatively with the electrolyte solution of the EDLC. The synthetic carbon precursors can include any non-graphitizable polymeric material that, for example, leaves greater than 10% carbon yield upon carbonization. Accordingly, "non-graphitizable" polymeric material as used herein can also include substantially non-graphitizable polymeric material wherein a substantial portion of carbon does not form graphite like crystals on carbonization. In contrast, and as discussed below, the additive should be selected from a group of molecules that leave no carbon behind after carbonization.

Examples of useful synthetic carbon precursors include crosslinkable resins, such as thermosetting resins. It is contemplated that the carbon precursors will be uncured at time of mixing with the additive. By not curing the carbon precursor, the precursor will be uncrosslinked, meaning that that precursors are not fully crosslinked or are at a soluble reactive oligomer stage. As discussed later herein, utilization of an uncrosslinked carbon precursor allows molecular level composite formation of the carbon precursor and additive not possible in conventional processes wherein the carbon precursor is already crosslinked into an insoluble solid. Of course, synthetic carbon precursors of the invention can include a single precursor material or a mixture of two or more precursor materials.

The synthetic carbon precursor can be in liquid or solid form. A particular example of liquid form carbon precursors includes phenolic and furan resins. Phenolic resins (i.e., resole and novelac) characteristically have a low viscosity, high carbon yield, high degree of crosslinking upon curing relative to other precursors and are relatively low cost. Phenolic resins available from Occidental Chemical Corporation, Niagara Falls, N.Y. under the product name of Plyophen 43290 may be used. Plyophen 43290 is a liquid one step phenolic resin containing phenol, formaldehyde, and water, having a specific gravity of 1.22-1.24, a boiling point of 100° C. and a pH of 7.5-7.7@100 gm/l. Another phenolic resin available from Borden Chemical Co. with the product name of Durite® may similarly be used. This resin is chemically similar to Plyophen 43290 but has a viscosity of about 300 cps. As discussed, furan resins, such as those available from QO Chemicals, Inc. under the name of Furcarb® LP, may'also be used. Furcarb® LP resins are preparations of phenol (4% max) in furfuryl alcohol, and have a specific gravity of 1.2 and a boiling point of 170° C. The viscosity is 300 cps.

Solid form resins such as phenolic novolac may also be used as the carbon precursor. If the carbon precursor is solid at room temperature (i.e., phenolic novalac), then it may be dissolved in a suitable solvent such as acetone to first form a liquid solution to which the additive (discussed later herein) may be added.

As previously discussed, one or more additives (such as inorganic molecules) can be mixed with the carbon precursor(s) prior to curing of the carbon precursor and prior to carbonization to ultimately yield carbon materials having controlled porosity and enhanced pore diameter. Inorganic molecules that can be utilized as the additive include, for example, any alkali or non alkali salt which allows curing of resin (discussed later herein). Particular examples of such salts include KOH, NaOH, NaCl and KCl. A variety of other inorganic salts or other inorganic molecules may similarly be used with the methods and materials of the invention, and accordingly, the invention should not be limited to the particular examples recited herein.

The discussion above references examples of carbon precursors and additives (such as inorganic molecules) that can be used to form the carbon materials of the invention. It will be understood that while a few specific examples have been discussed herein, a number of other carbon precursors and/or additives may be used to create the carbon material of the present invention for use as electrodes or other components in ultracapacitors that will exhibit high energy density.

Having described a number of carbon precursors and additives that may be used to form the carbon material described herein, the method of manufacturing or synthesizing the carbon material will now be described. Without being limited by theory, and as discussed later herein, it is believed that mixing a carbon precursor with an inorganic molecule, prior to curing the carbon precursor, allows the carbon to better accept and bind with the additive to provide for uniform distribution of the additive molecule in the carbon. Moreover, it is believed that by mixing the carbon precursor with the inorganic molecule prior to cure, the additive will distribute uniformly within the carbon precursor so that when carbonized, the carbon will condense or crosslink around the additive to eventually yield a carbon material with controlled or expected porosity and enhanced pore diameters in a way that is unique as compared to carbons manufactured by conventional processes.

The carbon precursor may be mixed with the additive by any conventional method, including introduction of each of the components into mixing vessel followed by agitation. Where an inorganic salt such as KOH and a synthetic non-graphitizable resin are used as the additive and carbon precursor, respectively, the amount of KOH added compared to the amount of resin added to the mixture can be 2:1 on wt basis of dry material. However, it is contemplated that the additive/carbon precursor mixture can be in the range of 0.5-3.0. In addition, the carbon precursors and/or additives can be mixed with an appropriate solvent. For example, an additive (i.e., KOH) can be mixed with a solvent such as water in the range of 5-60 wt % and preferably 25-50 wt %. This solution can then be mixed with a carbon precursor solution (i.e., resole) wherein the carbon precursor solution has been mixed with water in the range of 5-80 wt % and preferably 40-80 wt %.

As previously discussed, this mixing step allows molecular level mixing and uniform distribution of the additive throughput the carbon precursor. The uniform mixing is the result of using an uncured carbon precursor so that significant (if any) crosslinking has not taken place. Particularly, as discussed above, a carbon precursor, such as phenolic resin, can be uncrosslinked (e.g., precursors that are not fully crosslinked or are at a soluble reactive oligomer stage). The oligmer solution is mixed with an additive (i.e., an alkali solution in water). This process allows molecular level mixing of the phenol-formaldehyde oligomers and the additive. The mixture may then be thermally treated to create a molecular-composite of the precursor and the additive.

The carbons described herein may then be carbonized by any conventional method thereby allowing atomic level incorporation of the inorganic molecule. During carbonization, the carbon is able to form around the additive. Particularly, during carbonization, low molecular weight organic compounds are broken off of the resin structure and carbon formation is initiated. During this carbonization phase, the inorganic additive begins to agglomerate into larger uniform size because of the high level of additive and surface energy of the additive particles. During the carbonization process, when the carbon molecules are condensing, the additive molecules come into contact with each other. Particularly, the high surface energy and the high temperature reduces the energy barrier to sintering and the additive molecules agglomerate. Carbonization generally involves heating to high temperature in inert atmosphere to remove low molecular weight molecules and leaving carbon residue behind. Nitrogen can be used in this process and the temperature should be at least 500° C., but may be anywhere from 500° C.-1100° C.

The inorganic molecule may be removed via an extraction process such as solvent extraction or steam extraction. Depending on the additive used before crosslinking (e.g., inorganic molecule, and the particular type), the additive removal method may differ. For inorganic molecules such as sodium or potassium salts, the removal may be conducted via exposure to water or steam at ambient or high pressures. In one embodiment, the additive may be removed at low temperatures, such as at 300° C. As used herein, however, "removing the additive" can be conducted during carbonization, subsequent extraction processes or both, and can include leaching processes. Any conventional leaching process may be utilized to ultimately form the carbon materials herein.

The above referenced processes result in a carbon material with controlled porosity and enhanced pore diameters. As discussed herein, because the inorganic molecule is uniformly mixed with the carbon precursor, the precursor uniformly crosslinks around or condenses around the inorganic molecule. Upon further carbonization, washing (where required) and leaching, the additive is removed and the open pores are formed which are uniformly disbursed. Also, because of the uniform mixing of the inorganic molecule into the carbon, the pores will deeply penetrate the carbon upon leaching. For example, it has been found that carbon materials manufactured by the methods described herein result in carbon materials with pores penetrating completely through the carbon material. Moreover, because the inorganic molecule agglomerates within the carbon precursor, thereby leaving more space between crosslinks within the precursor, pores of greater diameter are formed. For example, it has been found that a majority (greater than 50%, and in some embodiments 75%) of the pores distributed about the carbon material have a pore diameter greater than 40 Å. Moreover, it has been found that the pores distributed about the carbon material have a pore diameter in the range of 20-120 Å (pore size distribution). The large size of the pores allows easier access to the electrolyte ions to the entire carbon surface area and allow easier movement of the ions. This easy access leads to lower ionic resistance, and hence, higher power density for an EDLC device incorporating such a carbon material.

Figure 1B:
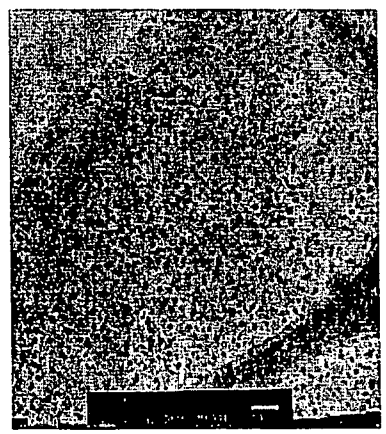
FIG. 1B is a transmission electron micrograph illustrating an example of the carbon midway through the process of additive (inorganic molecule) removal.

The uniform distribution and agglomeration of the additive further allows porosity to be effectively controlled. Particularly, pore diameter size, distribution and penetration can be better predicted as a result of the processes described above. FIG. 1A is an electron micrograph illustrating an example of the carbon material obtained in accordance with the invention. As illustrated, the carbon material comprises pore size diameters in the range of 20-120 Å distributed throughout the carbon material. Moreover, a majority of the pores have diameters in excess of 40 Å. As previously stated, this characteristic is the result of the mixing the additives with the carbon precursors by methods described herein. Particularly, FIG. 1B is an electron micrograph illustrating an example of the carbon midway through the process of additive (inorganic molecule) removal. The electron micrograph of FIG. 1B illustrates the size of the inorganic species agglomerated within the carbon precursor which indicates the pore diameter and pore diameter distribution illustrated in the carbon material of FIG. 1A.

Figure 2:
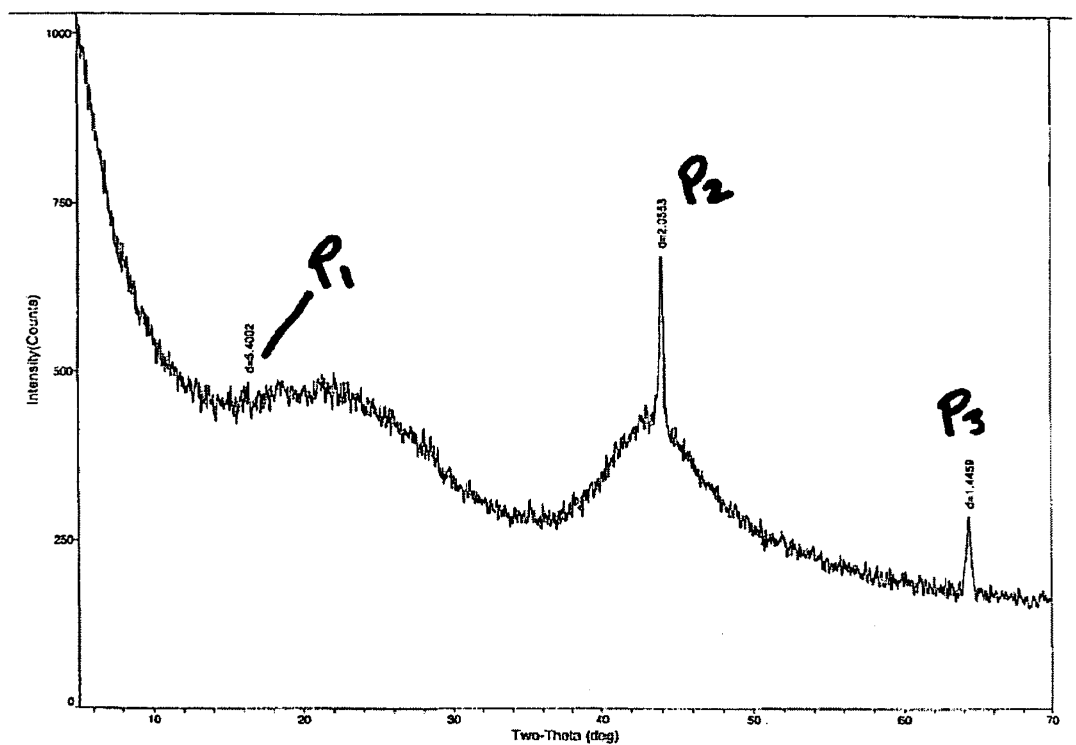
FIG. 2 is a diagram illustrating the results of X-ray diffraction measurements of a carbon material in accordance with one embodiment of the present invention.

In addition, FIG. 2 shows the result of a measurement for the X-ray diffraction intensity of a carbon material obtained by the processes contemplated herein. In FIG. 2, the peaks P1, P2, P3, exist at the positions of two-theta of about 14°, 44° and 64°, respectively. Moreover, P1, P2, P3 have an interlayer distance of (d) of 5.4002, 2.0553 and 1.4459, respectively.

Carbon materials manufactured by processes contemplated herein can be used to manufacture electrodes or other components for use in high energy devices. In order to fabricate an electrode from the carbon material, the resulting carbon material can be pulverized to a regulated grain size of less than 100 μm. The pulverized carbon material may then be combined with carbon black, powdered graphite, metal powder or any other conductivity promoting agent. The conductivity promoting agent imparts conductivity to the carbon material. A bonding agent such as PTFE, PVDF, PE or PP or aqueous solvent based binders known in the art can also be added. To produce sheet electrodes, these materials can be worked together and rolled into a sheet. In one embodiment, the compounding ratio of three components such as the carbon material, the conductivity promoting agent, and the binding agent can be approximately 80 wt % or more carbon material, up to 10 wt % conductivity promoting agent and up to 10 wt % binding agent. Of course, any conventional process for manufacturing an electrode utilizing the carbon materials described herein can by utilized. It has been found that electrodes formed by the processes herein have a capacitance as high as 280-320 F/g in aqueous electrolytes and 120-200 F/g in organic electrolytes.

Figure 3:
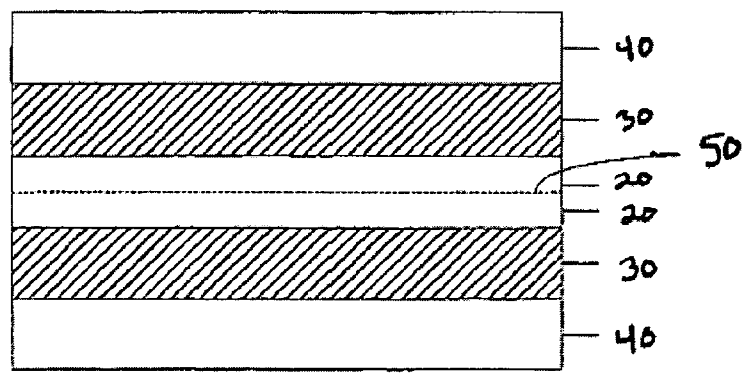
FIG. 3 is a schematic view of an EDLC formed in accordance with one embodiment of the present invention.

Electrodes manufactured with carbon materials described herein can be incorporated into EDLC's with enhanced energy density and specific power. As previously discussed, EDLC's can include any device configured to store a charge including, for example, standard jelly roll designs, prismatic designs, honeycomb designs, hybrids (e.g., one electrode is carbon and the other electrode is a pseudo capacitance material such as a metal oxide, conducting polymers or others), supercapacitors, ultracapacitors or other designs known in the art. Moreover, EDLC's utilizing the carbon materials described herein can be constructed through any variety of conventional processes. The arrangement of the basic elements of one embodiment of an EDLC is shown in FIG. 3. An electrolyte 20 is in contact with and able to permeate into two opposing porous electrodes 30. For example, the electrodes can be stacked on top of each other via a separator to form positive and negative electrodes. The electrodes can then be impregnated in an electrolyte solution. The electrolyte solution may include: i) a salt (i.e., Me3EtN+, MeEt3N+, EtN−, BF4−, PF6−) or others known in the art dissolved in the organic solvent (i.e., Acetonitrile (AN), Propylene Carbonate (PC)), ii) a salt in an aqueous solvent (i.e., KOH or inorganic acids such as H2SO4) or iii) ionic liquids and other electrolytes known in the art. The electrodes 30 may be in contact with and between two metallic current collectors 40. In the case of a fluid or compressible electrolyte, a separator or spacer 50, permeable by the electrolyte, can be interposed between the electrodes 30 to prevent shorting.

As expressed in the examples below, EDLC's assembled with electrodes including carbon materials manufactured by the processes contemplated herein result in EDLC's having energy densities of at least about 9 Wh/l and as high as in the range of about 12-15 Wh/l. Such EDLC's also have a specific power of greater than about 4000 W/kg and can exceed more than 5000 W/kg. Such energy density and specific power have not heretofore been achievable through conventional processes.

To more fully illustrate the invention, the following non-limiting examples are presented. All parts, portions, and percentages are on a weight basis unless otherwise stated.

EXAMPLE 1

Three hundred grams of 45 wt % NaOH solution in water was mixed with 100 grams of synthetic phenolic resole resin which contains about 70% resin in 30% water. The mixture was subsequently dried and cured at 180° C. to form a sponge like mass. This mass was heated in nitrogen up to 800° C. for two hours to carbonize the resin. The carbonized resin was subsequently steam treated to remove the sodium from the carbon. This carbon was then ground to approximately 10 micron mean particle size. The carbon was mixed with 10 grams of carbon black and 10 grams of PTFE to obtain a well mixed mass. This mixture was subsequently rolled on a roll mill to obtain a thin film approximately 50 microns thick. From the film obtained, carbon electrodes were stamped out.

Figure 4:
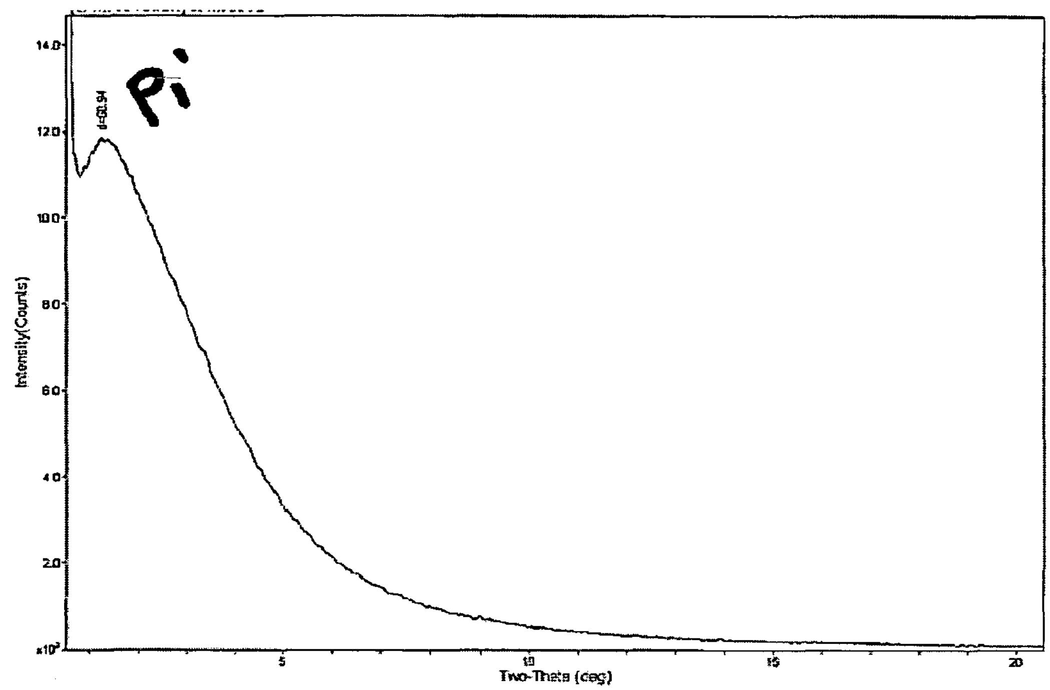
FIG. 4 is a diagram illustrating the results of X-ray diffraction measurements of carbon materials obtained by processes described in Example 1.

The electrodes were then soaked with an electrolyte solution (1M TEA-TFB in acetonitrile). A porous separator was also soaked in the electrolyte solution and the two carbon electrodes with the separator in between were assembled together with aluminum current collectors into a button cell. Standard voltametric as well galvanostatic tests were carried out to measure the performance of the cell. The measured energy density of the device was 15 Wh/l and the specific power was 5713 W/kg. The BET surface area of this carbon was 1600 $m^2/g$. FIG. 4 shows the result of measurement for the low angle X-ray diffraction pattern of the carbon material of Example 1. The peak P1', exists at the position of two-theta of about 1.5°. Moreover, P1' has an interlayer distance (d) of 68.94.

EXAMPLE 2

Figure 5:
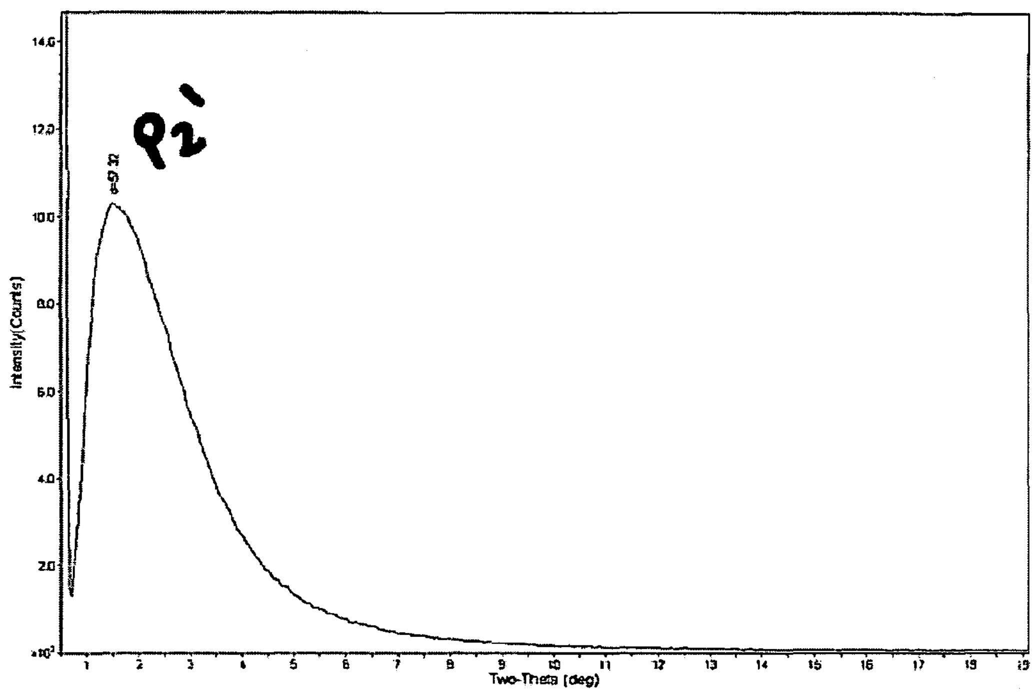
FIG. 5 is a diagram illustrating the results of X-ray diffraction measurements of carbon materials obtained by processes described in Example 2.

The experiment of Example 1 was repeated, but instead of using carbon materials manufactured by processes herein, a standard conventional commercial carbon was used. Particularly, a carbon from PICA USA Inc., Columbus, Ohio, specially developed for EDLC applications was utilized. Standard voltametric as well galvanostatic tests were carried out to measure the performance of the cell. The measured energy density of the device was 6 Wh/l and the specific power was 3707 W/Kg. The BET surface area of this carbon was 1800 $m^2/g$. FIG. 5 shows the result of measurement for the low angle X-ray diffraction pattern on the carbon of this example. The peak P2', exists at the position of two-theta of about 1.5°. More importantly, P2' has an interlayer distance (d) of 57.32.

EXAMPLE 3

Figure 6:
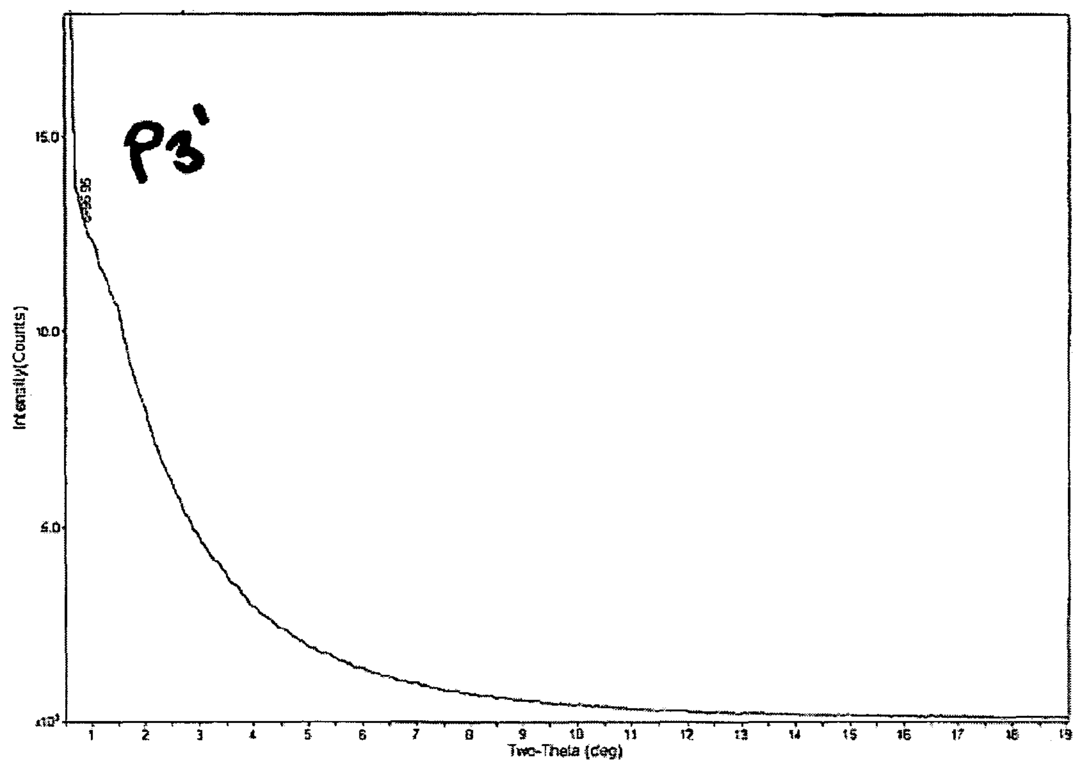
FIG. 6 is a diagram illustrating the results of X-ray diffraction measurements of carbon materials obtained by processes described in Example 3.

The experiment of Example 1 was repeated, but instead of using 45 wt % NaOH solution, 45% wt KOH solution was utilized. Standard voltametric as well galvanostatic tests were carried out to measure the performance of the cell. The measured energy density of the device was 15.6 Wh/l and the specific power was 6518 W/kg. FIG. 6 shows the low angle X-ray diffraction pattern of the carbon obtained in Example 3 The peaks P1', exists at the position of two-theta of about 1°. Moreover, P3' has an interlayer distance (d) of 95.95.

EXAMPLE 4

The experiment of Example 3 was repeated, but rather than heating the mass up to 800° C., the mass was heated up to 900° C. Standard voltametric as well galvanostatic tests were carried out to measure the performance of the cell. The measured energy density of the device was 14 Wh/l and specific power was 3707 W/Kg. BET surface area of this carbon was 1600 $m^2/g$.

It is a matter of course that the electric double layer capacitors, capacitor materials and the methods for manufacturing the same according to the present invention are not limited to the embodiments described above. Many alternatives, modifications and variations will be apparent to those skilled in the art of the above teaching. For example, the carbon materials in accordance with the present invention may be manufactured with a number of carbon precursors and additives. Moreover, many processes may be utilized to construct electrodes and EDLC's that utilize the carbon materials described herein. Accordingly, while some of the alternative embodiments have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What is claimed is:

1. A method of manufacturing an electrode comprising:

providing an uncured, synthetic, non-graphitizable carbon precursor and an alkaline additive;

mixing said alkaline additive with said uncured, synthetic, non-graphitizable carbon precursor prior to curing said carbon precursor such that a ratio of the alkaline additive to the carbon precursor is between about 2:1 and 3:1;

carbonizing said carbon precursor and said alkaline additive;

removing said alkaline additive via exposure to water or steam during the carbonizing and creating a carbon material; and forming said electrode from said carbon material.

2. The method of claim 1 wherein said carbon precursor is phenolic resin.

3. The method of claim 1 wherein said alkaline additive is selected from a group consisting of NaOH, KOH and mixtures thereof.

4. The method of claim 1 wherein said carbon material has a majority of pores with diameters greater than 40 Å and a pore diameter distribution in the range of 20-120 Å.

5. The method of claim 1 wherein said electrode has a capacitance greater than 100 F/g.

6. The method of claim 1 further comprising curing said carbon precursor after said mixing and before said carbonizing.

7. A method of manufacturing an electric double layer capacitor comprising:

forming an electrode by a method comprising:

providing an uncured, synthetic, non-graphitizable carbon precursor and an alkaline additive;

mixing said alkaline additive with said synthetic, non-graphitizable carbon precursor prior to curing said carbon precursor such that a ratio of the alkaline additive to the carbon precursor is between about 2:1 and 3:1;

carbonizing said carbon precursor and said alkaline additive;

removing said alkaline additive via exposure to water or steam during the carbonizing and creating a carbon material;

forming said electrode from said carbon material;

immersing said electrode in an electrolyte solution;

providing a current collector; and assembling said electrode, said current collector and said electrolyte solution into said electric double layer capacitor.

8. The method of claim 7 wherein said alkaline additive is selected from a group consisting of NaOH, KOH and mixtures thereof.

9. The method of claim 7 wherein said electric double layer capacitor has an energy density of at least about 9 WW1.

10. The method of claim 7 wherein said electrode has a capacitance greater than 100 F/g.

11. The method of claim 7 further comprising curing said carbon precursor after said mixing and before said carbonizing.

* * * * *